(12) United States Patent
Walker et al.

(10) Patent No.: US 10,112,141 B2
(45) Date of Patent: Oct. 30, 2018

(54) PURIFICATION COLUMN

(71) Applicant: WALKER FILTRATION LTD, Tyne & Wear (GB)

(72) Inventors: Brian Walker, Tyne & Wear (GB); Simon Wise, Tyne & Wear (GB); Peter Carney, Sunderland (GB); Peter McHugh, Tyne & Wear (GB); Chris Nixon, Tyne & Wear (GB)

(73) Assignee: WALKER FILTRATION LTD, Washington, Tyne & Wear (GB)

( * ) Notice: Subject to any disclaimer, the term of this patent is extended or adjusted under 35 U.S.C. 154(b) by 0 days.

(21) Appl. No.: 15/409,094

(22) Filed: Jan. 18, 2017

(65) Prior Publication Data
US 2018/0147524 A1 May 31, 2018

Related U.S. Application Data

(63) Continuation of application No. 14/605,635, filed on Jan. 26, 2015, now Pat. No. 9,604,173.

(30) Foreign Application Priority Data

Jan. 27, 2014 (GB) .................................. 1401351.0

(51) Int. Cl.
*B01D 53/02* (2006.01)
*B01D 50/00* (2006.01)
(Continued)

(52) U.S. Cl.
CPC .......... *B01D 50/002* (2013.01); *B01D 29/114* (2013.01); *B01D 29/96* (2013.01);
(Continued)

(58) Field of Classification Search
CPC ........ B01D 2201/301; B01D 2201/302; B01D 2201/306; B01D 29/114; B01D 29/96;
(Continued)

(56) References Cited

U.S. PATENT DOCUMENTS 5,858,227 A * 1/1999 Stone .................. B01D 29/114
210/234
7,828,881 B2 * 11/2010 Barnwell ............. B01D 46/003
210/443
(Continued)

*Primary Examiner* — Christopher P Jones
(74) *Attorney, Agent, or Firm* — Egbert Law Offices, PLLC

(57) ABSTRACT

A purification column is provided in which fluid is purified by flow through a purifying component. The column includes an annular wall defining a bore which, in use, contains the purifying component. The column further includes an inlet port to the bore comprising a first aperture through the annular wall, the inlet port being adjacent one end of the column. The column further includes an outlet port from the bore comprising a second aperture through the annular wall, the outlet port being adjacent the same end of the column as the inlet port. The column further includes a flow guidance device within the bore and removably connected to the inlet and outlet ports for guiding the fluid to the purifying component from the inlet port and for guiding the fluid from the purifying component to the outlet port. The flow guidance device maintains separation of the fluid flows to and from the purifying component.

18 Claims, 11 Drawing Sheets

(51) Int. Cl.
    *B01D 35/30*     (2006.01)
    *B01D 29/11*     (2006.01)
    *B01D 29/96*     (2006.01)
    *B01D 45/12*     (2006.01)
    *B01D 46/00*     (2006.01)
    *B01D 46/30*     (2006.01)

(52) U.S. Cl.
    CPC .............. *B01D 35/30* (2013.01); *B01D 45/12* (2013.01); *B01D 46/002* (2013.01); *B01D 46/0023* (2013.01); *B01D 46/30* (2013.01); *B01D 2201/301* (2013.01); *B01D 2201/302* (2013.01); *B01D 2201/306* (2013.01)

(58) Field of Classification Search
    CPC ...... B01D 35/30; B01D 45/12; B01D 46/002; B01D 46/0023; B01D 46/30; B01D 50/002
    See application file for complete search history.

(56) References Cited

U.S. PATENT DOCUMENTS

| | | | |
|---|---|---|---|
| 9,604,173 B2 * | 3/2017 | Walker | B01D 45/12 |
| 2005/0252848 A1 * | 11/2005 | Miller | B01D 35/147 |
| | | | 210/445 |

* cited by examiner

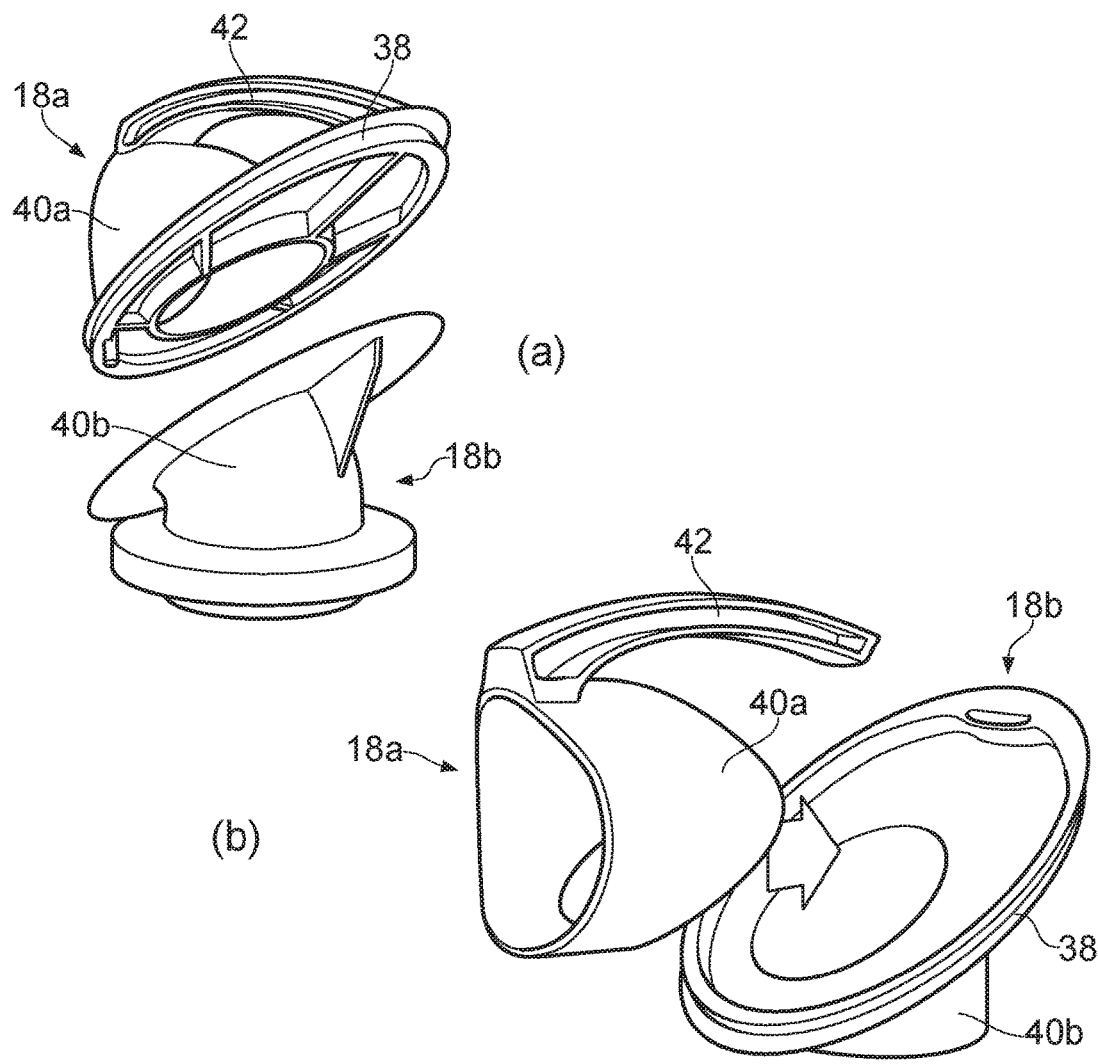
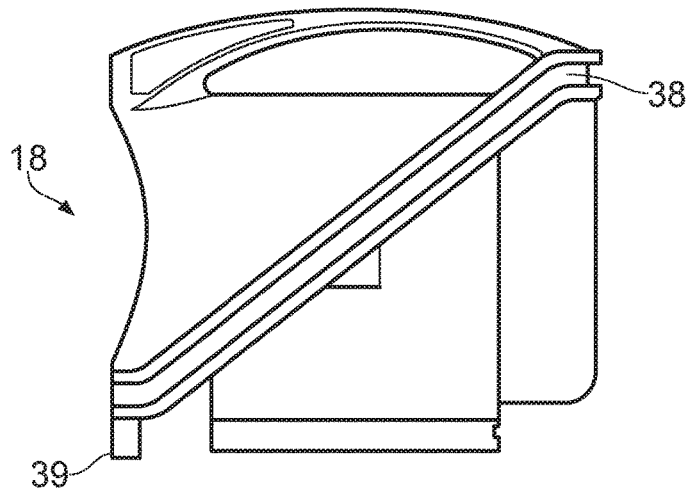
FIG. 4

PURIFICATION COLUMN

CROSS-REFERENCE TO RELATED APPLICATIONS

The present application is a continuation of U.S. patent application Ser. No. 14/605,635, filed on Jan. 26, 2015, and entitled "Purification Column", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to a purification column in which fluid is purified by flow through a purifying component.

2. Description of Related Art Including Information Disclosed Under 37 CFR 1.97 and 37 CFR 1.98

Purification columns are commonly used to purify fluids (gases or liquids) by passing the fluid through the column, contaminants or other unwanted parts of the fluid being extracted from the fluid by a purifying component, such as an absorbent, adsorbent, filter etc., contained in the column. For example, purification columns can be used as: compressed air and gas dryers, gas generators (e.g. generation of $N_2$ by removal of $O_2$ and $CO_2$ from air), dust filters, refrigerant filters, vacuum pump filters, oil mist filters, etc.

Some purifying components can be re-generated in-situ. For example desiccants, such as activated alumina and molecular sieve materials used to remove moisture from compressed air and gas, may be re-generated using pressure swing technology, vacuum technology and/or heat regenerative technology. On the other hand, if the purifying component cannot be re-conditioned in-situ it may have to be replaced at regular intervals. For example, when activated carbon is used to remove hydrocarbon contamination from compressed air or gas, the carbon is generally replaced once spent.

Smaller purification columns are conventionally manufactured as two-piece moulded or cast constructions consisting of firstly, a top head manifold which provides a locator for a purifying component and inlet and outlet ports, and a lower filter bowl containing the purifying component, both parts being provided with male and female machined connections to enable them to be joined together as a pressure-containing sealed unit.

To manufacture a full range of cast component columns with varying pipe connections and flow capacities, can be costly due to the large number of moulding tools necessary to make the parts. In particular, individual top head manifolds may be connected to filter bowls of varying length, each requiring a separate moulding tool. Further, post-moulding, mating parts have to be accurately machined to enable them to be fastened together and to provide the purifying component locator.

The conventional method of manufacturing purification columns becomes particularly problematic when a plurality of similar columns are close-coupled together into a single purification system as few manufacturing cost-savings can be realised despite the increased number of columns.

BRIEF SUMMARY OF THE INVENTION

It would be desirable to provide a purification column that can be manufactured at lower cost, and which can be easily close-coupled to other columns.

In a first aspect, the present invention provides a purification column in which fluid is purified by flow through a purifying component, the column including:
- an annular wall defining a bore which, in use, contains the purifying component,
- an inlet port to the bore comprising a first aperture through the annular wall, the inlet port being adjacent one end of the column,
- an outlet port from the bore comprising a second aperture through the annular wall, the outlet port being adjacent the same end of the column as the inlet port, and
- a flow guidance device within the bore and removably connected to the inlet and outlet ports for guiding the fluid to the purifying component from the inlet port and for guiding the fluid from the purifying component to the outlet port, the flow guidance device maintaining separation of the fluid flows to and from the purifying component.

Therefore, rather than having a top head manifold providing the inlet and outlet ports and a separate lower bowl containing the purification component, the apertures of the inlet and outlet ports are formed in the annular wall, which also contains the purifying component. In this way, the number and/or complexity of components making up the purification column can be reduced. In particular, machining operations, such as those needed to provide male and female connections enabling the joining together of a top head manifold and a lower bowl, can be avoided, and a full range of purification columns can be achieved at a lower cost.

The purification column of the first aspect is amenable to close-coupling together into a single purification system with other similar columns.

Thus, in a second aspect, the present invention provides a purification system having a row of two or more purification columns of the first aspect, the columns being arranged in flow series such that, between the inlet port of the first column and the outlet port of the last column, the fluid enters, flows through and exits each column in turn.

In such a system, the individual columns can be of equal or varying length, and can have similar or different functions. For example, one air purification system may have a short first column in which the purifying component is a water separator, followed by three longer subsequent columns in which the respective purifying components are filter assemblies.

However, the column of the first aspect may itself be multi-bore. That is, it may include a unitary body having a plurality of annular walls defining respective and parallel bores which, in use, contain respective purifying components. The bores may then be arranged in flow series having interconnecting inlet and outlet ports, such that as between each pair of neighbouring bores the second aperture of the upstream bore opens to the first aperture of the downstream bore. In this way the bores of a single multi-bore column can emulate a row of columns of the second aspect.

Another possibility is to use multi-bore columns to produce a banked purification system having parallel purification rows, thereby increasing overall fluid flow rates while retaining the pressurisation capability of small diameter columns In particular, in a third aspect, the present invention provides a purification system having two or more multi-bore purification columns of the first aspect, the columns forming a plurality of parallel purification rows, with each column donating a respective bore to each row, wherein, within each row, the bores are arranged in flow series such that, between the inlet port to the first bore and the outlet port from the last bore, the fluid enters, flows through and exits each column in turn.

In a fourth aspect, the present invention provides an extruded body which forms the annular wall(s) of the purification column of the first aspect. In a fifth aspect, the present invention provides the flow guidance device of the purification column of the first aspect. Optionally, the flow guidance device may be integrated with a cover for closing the bore at one end of the column. Optionally, the flow guidance device may be integrated with a purifying component or a pre- or post-purification treatment component.

Optional features of the invention will now be set out. These are applicable singly or in any combination with any aspect of the invention.

The column may include the purifying component contained in the bore. Typically, the whole of the purifying component is contained in the bore. The purifying component can be a sorbent. Another option, however, is for the purifying component to be an assembled entity such as a filter element or cyclonic separator. The purifying component can be non-replaceable. More typically, however, the purifying component is replaceable.

According to one option, the purifying component (e.g. sorbent) is contained within (typically replaceable) cartridges. Each cartridge may be sealed to the fluid guidance device, which in turn is sealed to the inner surface of the annular wall. This can help to ensure that the fluid flows through the cartridge without by-pass between cartridge and wall.

Although configured to contain a purifying component, a pre- or post-purification treatment component can instead be contained in the bore. Accordingly, the column may include such a pre- or post-purification treatment component contained in the bore. Examples of pre- or post-purification treatment components are: pressure adjustors, lubricators, and heat exchangers. Thus a typical compressed air system (commonly referred to as a filter/regulator/lubricator (FRL) assembly) has a first stage in which one or more filter assemblies filter the compressed air, a second stage in which a pressure adjustor adjusts the pressure of the compressed air, and a third stage in which a lubricator adds lubricating oil to the compressed air. Another typical system has a first stage in which one or more filter assemblies filter the compressed air, and a second stage in which a heat exchanger heats or cools the compressed air. Alternatively, the heat exchanger can be deployed before the one or more filter assemblies. Thus in what follows, references to purifying components can also relate to pre- or post-purification treatment components.

The annular wall may be an extruded body. This can be a more cost-effective way of making the column than conventional two-piece moulded or cast constructions. For example, the annular wall can be an aluminium alloy or plastic extruded body. The first and second apertures can be formed by drilling through the annular wall post-extrusion. When the column is multi-bore, the unitary body having the plurality of annular walls defining respective and parallel bores may be an extruded body.

The column typically has a length to bore internal diameter aspect ratio of at least 4:1, although smaller ratios are possible.

The first and second apertures may diametrically oppose each other across the bore. Such an arrangement facilitates the assembly of purification systems of the second or third aspect with rows of purification columns arranged in flow series. In particular, diametrically opposed apertures support modular systems in which a column can be inserted at any given position in a row.

The purification column may further include a first cover closing the bore at one end of the column, for example, the cover being removable to allow withdrawal, replacement or maintenance of the purifying component. Conveniently, the first cover may be at the same end of the column as the inlet and outlet ports.

The purification column may further include a second cover closing the bore at the other end of the column. The second cover may also be removable.

One option is for the flow guidance device to sealingly engage around a circumference of the inner surface of the annular wall to maintain separation of the fluid flows to and from the purifying component. Another option, however, is for the flow guidance device to sealingly engage around the first aperture or the second aperture to maintain separation of the fluid flows to and from the purifying component.

The flow guidance device may include a conduit sealingly extending between inlet and outlet port sides of the device. For example, such a conduit can further extend to a differential pressure detector which measures the differential pressure between inlet and outlet port sides of the device.

The first cover may be formed integrally with the flow guidance device. This allows the integrated first cover and flow guidance device to be removed and replaced together. Further, a single piece moulding for the integrated first cover and flow guidance device can reduce production costs. Additionally or alternatively, the flow guidance device may be formed integrally with or be permanently connected to the purifying component, similarly allowing simultaneous withdrawal, replacement or maintenance of the integrated flow guidance device and purifying component. In general, however, the fluid guidance device directs the fluid on a specific directional flow path to enhance the operating efficiency of the purifying component.

The annular wall may provide respective external planar engagement surfaces to the inlet and outlet ports for connection to opposing planar engagement surfaces of ports of neighbouring columns. The planar engagement surfaces can allow slidable movement of neighbouring columns relative to one another along any direction lying within the plane of the connecting surfaces. In a purification system having a row of columns, this can facilitate column removal, replacement or addition, and can also facilitate the alignment of connected ports of neighbouring columns In such a row, each pair of connecting planar engagement surfaces can have a sealing gasket (e.g. housed in a recess formed in one of the surfaces) to provide a fluid-tight seal between their respective ports. To prevent relative sliding movement between neighbouring columns when assembled, pins may be used to locate and positionally lock the respective columns together, thereby helping to ensure that the ports align correctly and a more rigid structure is produced.

A single-bore purification column may further have either, but more typically both, of a pair of removable porting blocks which can allow connection to an associated pipework system and which respectively guide fluid to the inlet port, and collect fluid from the outlet port. A multi-bore purification column in which the bores are arranged in flow series having interconnecting inlet and outlet ports may further have either or both of a pair of removable porting blocks which respectively guides fluid to the first inlet port, and collect fluid from the last outlet port.

A multi-bore purification column in which the bores are separate (i.e. not arranged in flow series) may further have a removable entrance manifold which splits an incoming fluid flow between the inlet ports of the bores, and/or a removable exit manifold which combines the fluid flows received from the outlet ports of the bores.

Such porting blocks and manifolds can help to reduce costs as they can provide interfaces to associated fluid systems, avoiding a need for dedicated interfacial connectors to be formed as integral parts of the annular wall.

Further optional features of the second or third aspect of the invention will now be set out.

Conveniently, the purification system of the second aspect of the invention may further have a removable porting block which guides fluid to the inlet port of the first column of the row, and/or a removable porting block which collects fluid from the outlet port of the last column of the row.

Similarly, the purification system of the third aspect of the invention may further have a removable entrance manifold which splits an incoming fluid flow between the inlet ports of the first column of the rows, and/or a removable exit manifold which combines the fluid flows received from the outlet ports of the last column of the rows.

The purification system may include fasteners to hold pairs of ports from neighbouring columns in fluid tight connection. For example, the fasteners can include bolts acting across neighbouring columns. Additionally or alternatively, associated with each pair of connected ports, the columns may provide respective angled fastening surfaces. The fasteners can then include wedge connectors, each of which is fitted over the angled fastening surfaces of a pair of connected ports and has wedging faces which can urge the angled fastening surfaces together to hold the ports in fluid tight connection. The angle between the fastening surfaces preferably lies in the range from 30° to 70°. Each pair of connected ports preferably has first angled fastening surfaces at one side of the connected ports and second angled fastening surfaces at the opposite side of the connected ports, a first wedge connector being fitted over the first angled fastening surfaces and a second wedge connector being fitted over the second angled fastening surfaces. Conveniently, the wedging faces of the first and second wedge connectors of each pair of connected ports can urge the angled fastening surfaces together under the action of one or more further fasteners (such as bolts) which extend between the first and second wedge connectors. For example, the first and second wedge connectors may be held together by two bolts. Associated with each pair of connected ports, the columns may also provide respective retention grooves, and each wedge connector may have protrusions which slidingly locate in the grooves to hold the wedge connector in position.

BRIEF DESCRIPTION OF THE SEVERAL VIEWS OF THE DRAWINGS

Embodiments of the invention will now be described by way of example with reference to the accompanying drawings in which:

FIG. 3 shows two options, (a) and (b), for a two-piece flow guidance device which is located in the bore of the annular wall;

FIG. 4 shows a single piece flow guidance device;

DETAILED DESCRIPTION OF THE INVENTION

Figure 1:
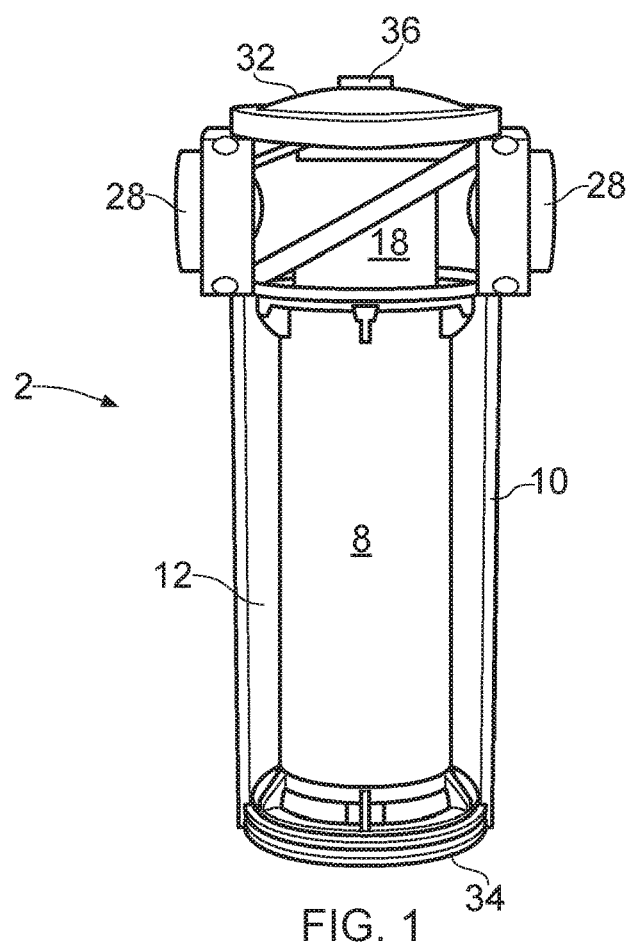
FIG. 1 shows a sectioned view of a purification column containing a purifying component in the form of a filter assembly.
Figure 2:
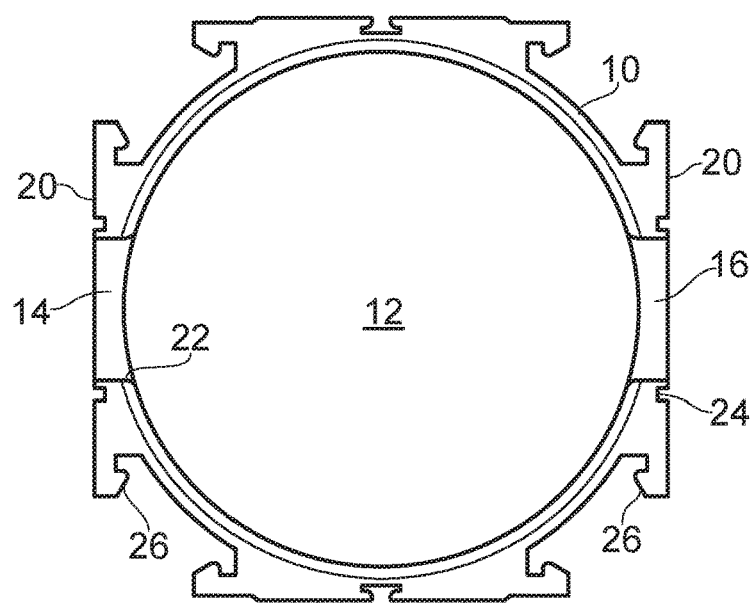
FIG. 2 shows a cross-section through an extruded annular wall of the purification column.

FIG. 1 shows a sectioned view of a purification column 2, having an extruded annular wall 10. The wall defines a central bore 12 which, in use, contains a filter assembly 8 or other type of purifying component. FIG. 2 shows a cross-section through the annular wall adjacent a first end of the column where diametrically opposed inlet and outlet ports comprising respective apertures 14, 16 are formed in the wall.

The material of the annular wall may be plastic or aluminium alloy, or any other suitable extrudable material. The column typically has an overall length to internal diameter aspect ratio of at least 4:1, although smaller ratios are possible. The column can normally operate between full vacuum and 20 Barg (300 psig), although higher operating pressures can be accommodated.

A removable flow guidance device 18 is located in the bore 12 at the first end of the column for guiding the fluid to the filter assembly 8 from the inlet port and for guiding the fluid from the purifying component to the outlet port. The flow guidance device also maintains separation of the fluid flows to and from the purifying component.

The annular wall 10 has opposed flat external faces 20 extending the length of the column. The apertures 14, 16 for the inlet and outlet ports are located centrally in and machined directly through these faces.

A small chamfer 22, or more preferably a small radius, can be machined into the annular wall 10 where each aperture 14, 16 intersects the bore 12 to prevent damage to a sealing gasket of the flow guidance device 18 when it is inserted into position.

The opposed flat external faces 20 are spaced from the bore 12 to produce a local annular wall thickness suitable for the type of inlet 14 and outlet 16 port being used. For instance, if the ports are of a female threaded type, then international standards dictate the depth of threads required and hence the minimum wall thickness required. If "push-in" fittings are used, then the manufacturer generally specifies a minimum wall thickness. If the column is intended to be a module in a row of columns (discussed below) then plain machined openings (as shown in FIG. 2) and shallow recesses 24 suitable for containing a seal, such as a gasket or "O" ring, may be adequate, because of the close-coupling with neighbouring columns. The flat faces 20 can be associated with angled fastening surfaces 26 extending along opposing edges of each face. By means of such fastening surfaces, multiple columns can be rigidly held together in a sealed formation by using wedge connectors, dowel pins and suitable bolting, as discussed more fully below.

As shown in FIG. 1, a removable porting block 28 can be attached to the inlet port and a further removable porting block 28 can be attached to the outlet port. These pipes can provide suitable interfaces to upstream and downstream fluid systems.

The open ends of the annular wall 10 have respective attachment means for attaching and sealing first 32 and second 34 pressure-retaining end covers. The attachment means can be of any type known in the art, but typically can be screw thread, circlip, bayonet or bolting. The end covers can have additional formations for aiding the removal of the end cover such as a hexagon protrusion 36 for spanner location or an internal square or hexagonal socket for a wrench or other means known in the art.

The first end cover 32 is located at the first end of the column and can have two openings to respective conduits (not illustrated) arranged in a manner known in the art to sense the differential pressure across the filter assembly 8 contained in the bore 12. These conduits are normally of a small diameter and fluidly connect with respective parts of the bore adjacent the apertures 14, 16, with at least one of the differential pressure conduits passing through the flow guidance device 18 to the opening in the end cover in a sealed manner. FIG. 6(b) discussed below shows an example of a pop-up indicator pressure gauge 78 connected to such conduits to indicate the differential pressure.

The second end cover 34 is located at the second end of the column and can have further (closeable) openings for venting or drainage of fluids or depressurization of the column. The second end cover can be machined to house an internal automatic drain. As shown in FIG. 1, the second end cover can provide support for the adjacent end of the purifying component 8, which in turn can ensure that the purifying component is located securely within the column.

For small diameter columns the pressure-retaining end covers 32, 34 can conveniently be of moulded plastic, but for larger diameter columns the covers may be metal.

Flow Guidance Device

As shown in FIG. 1, the flow guidance device 18 sits in a sealable manner within the annular wall 10 between the apertures 14, 16 of the inlet and outlet ports, thereby splitting the bore 12 into two chambers (an inlet chamber and an outlet chamber).

As shown in FIGS. 3(a) and (b), the flow guidance device 18 can be moulded in two parts, i.e. an upper 18a and a lower 18b part, which are then attached together. A groove 38 for a sealing gasket or O-ring that sealingly engages around a circumference of the inner surface of the annular wall 10 to maintain separation of the fluid flows to and from the filter assembly 8 can be provided by the upper part (FIG. 3(a)) or the lower part (FIG. 3(b)). The groove extends around the rim of a generally ovoid flange, which can be planar (as shown in FIGS. 3(a) and (b)) or may be curved (as shown in FIG. 4) to aid sealing efficiency. Another option is to modify the planar flange into a Z shape, with short parallel gasket grooves at each end of the long axis of the ovoid (e.g. one of the short grooves being below the first aperture 14 of the inlet port and the other short groove being above the second aperture 16 of the outlet port), which can enhance the seal between the annular wall and the flow guidance device. In addition, double gasket or double O-ring seals can be used.

A further option, illustrated in the example of FIGS. 14(a) and (b) discussed below, is to sealingly engage the flow guidance device 18 around the first aperture 14 to maintain separation of the fluid flows to and from the purifying component. Alternatively, the flow guidance device can be sealingly engage around the second aperture 16.

The flow guidance device 18 provides a conduit which extends from the aperture 14 of the inlet port to the inside of the filter assembly 8, the interior of the conduit being the inlet chamber of—14—the bore 12. In FIGS. 3(a) and (b), the two parts 18a, b of the flow guidance devices provide respective halves 40a, b of the conduit. The part of the bore surrounding the conduit provides the return path for the fluid flow from the outside of the filter assembly to the aperture 16 of the outlet port, and is the outlet chamber of the bore.

The conduit can be a simple dog-legged elbow (as shown in FIG. 1), or, to improve flow dynamics and to reduce pressure losses, can be a smooth bored elbow (as shown in FIGS. 3(a) and (b)). The shape and design of the flow guidance device can be various, but generally the angle through which the conduit turns the fluid flow is in the order of 90°.

Conveniently, the flow guidance device 18 can incorporate a handle 42 for facilitating insertion and removal of the device. Alternatively a handle (not shown) can be incorporated in the opposite end of the filter assembly to facilitate its removal from the second end.

To prevent the flow guidance device 18 rotating during service, mating location devices can be incorporated in the annular wall 10 and in the flow guidance device. These location devices can be configured to ensure the inlet to the conduit of the flow guidance device aligns with the inlet port of the column 2. FIG. 4 shows a male rib protrusion 39, which can be used for such purposes, on the lower edge of the ovoid flange containing the groove 38.

Figure 5:
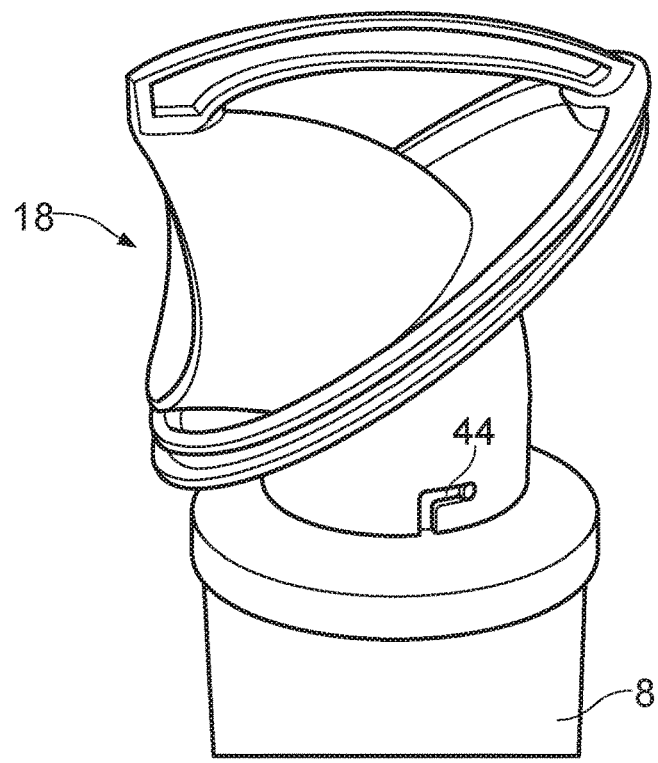
FIG. 5 shows a further single piece flow guidance device)

As shown in FIG. 5, the flow guidance device 18 can also incorporate location slots 44, or other suitable features, for permanently attaching or de-mountably attaching filter assemblies 8. Both options are particularly useful for top-loading columns.

Figure 6:
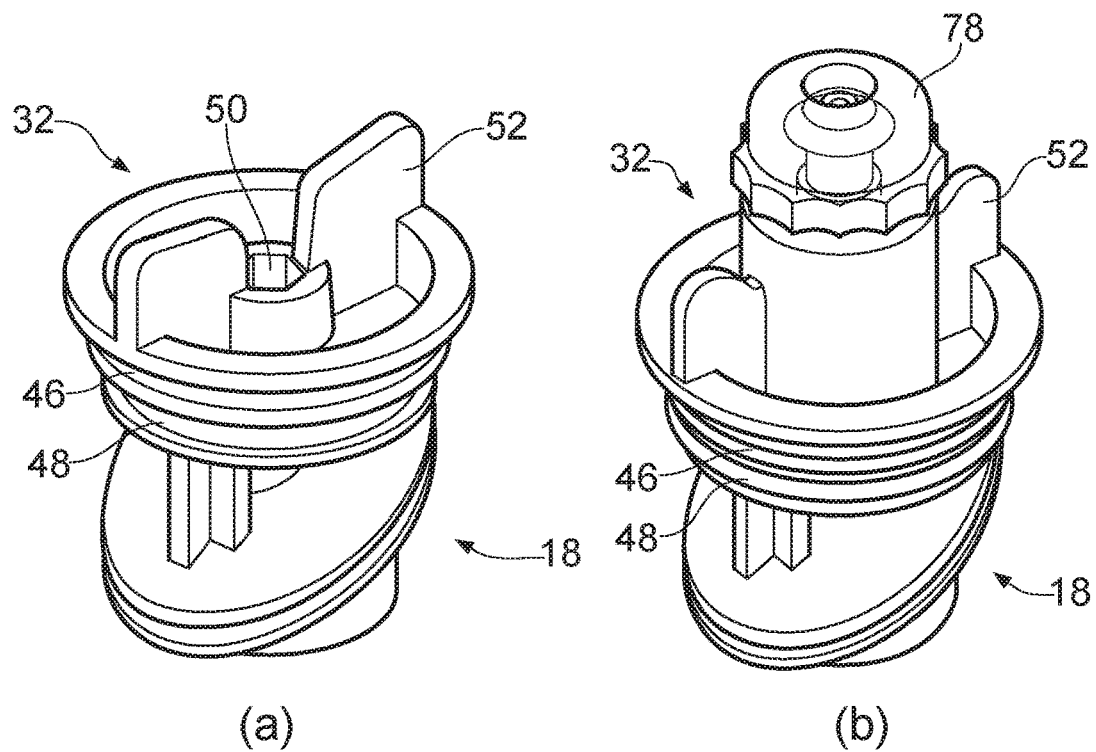
FIG. 6 shows two versions (a) and (b) of an integrated end cover and flow guidance device.

An option, particularly for smaller purifying components, is to combine the pressure-retaining first end cover 32 and the flow guidance device 18 together in one integrated part, as shown in FIG. 6 (a). In this example, the part is a one-piece moulding includes a thread 46 for connecting to the end of the column, a groove 48 for a gasket or O-ring to seal the end of the column, finger tabs 52 and a recessed socket 50 for aiding the removal of the part. The corresponding internal thread of the annular wall 10 can have a full thread "start" at a particular point on its circumference and the corresponding external thread on the integrated one-piece moulding can have a full thread "stop" on its circumference so that when both internal and external threads are fully engaged the "stop" and "start" points collide, preventing further rotation, thus ensuring the flow guidance device of the integrated part aligns in a pre-ordained position correctly with the inlet and outlet ports.

FIG. 6(b) shows a similar integrated first end cover 32 and flow guidance device 18 also including a pressure differential indicator 78 in the foul' of a pop-up indicator or gauge. When such an indicator is incorporated into the flow guidance device, respective small diameter conduits extending through the integrated part from the inlet chamber and the outlet chamber of the bore 12 to the indicator are required.

The flow guidance device 18 provides a convenient means for locating magnetic pressure differential senders of known type. Advantageously, such senders can avoid breach of the pressure envelope.

Figure 7:
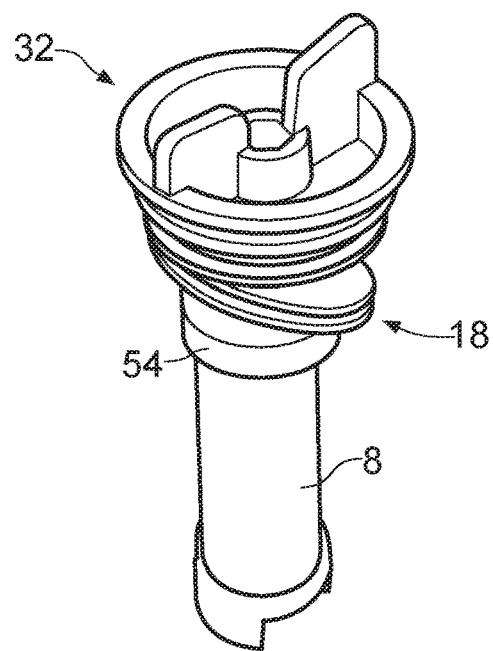
FIG. 7 shows an integrated end cover and flow guidance device bonded to a filter assembly.

As shown in FIG. 7, the flow guidance device moulding can include an annular cup shaped formation 54 for bonding to a filter assembly 8, thus making a disposable service part which combines all of the first end cover, flow guidance device and filter assembly.

Single-Bore Columns

The column 2 shown in FIG. 1 has as single bore 12. Such columns can be used as individual units. However, another option is to arrange a row, or "train", of such columns in flow series such that, between the inlet port of the first column and the outlet port of the last column, the fluid enters, flows through and exits each column in turn.

Figure 8:
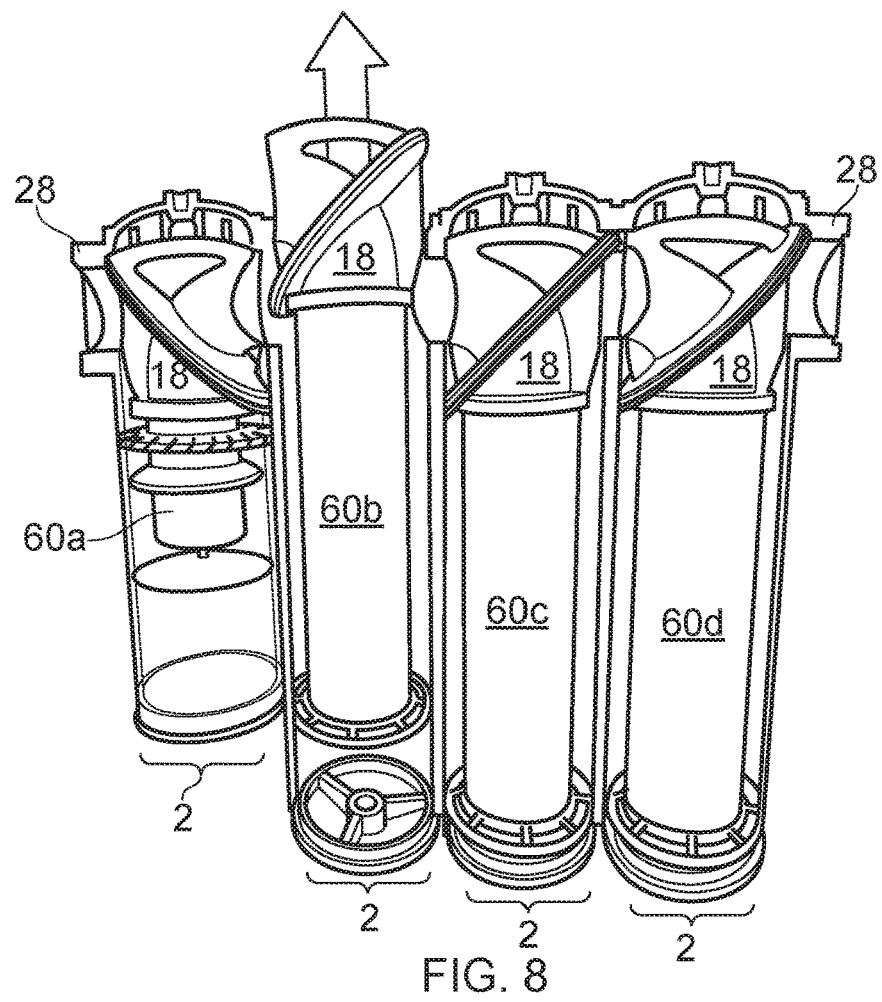
FIG. 8 shows a sectioned view of a purification system comprising a row of four close-coupled single-bore columns.

FIG. 8 shows, for example, a purification system comprising a row of four close-coupled columns 2, through which the air flows in series from left to right. The first (leftmost) column is shorter than the other three and contains a water separator 60a purifying component. The purifying components of the second, third and last columns are respectively a general purpose filter 60b, a high efficiency coalescing filter 60c and an activated carbon filter 60d. A porting block 28 is attached at the inlet port of the first column, and a porting block 28 is attached to the outlet port of the last column. The outlet port of each upstream column seals to the inlet port of its neighbouring downstream column via a gasket or "O" ring located in the shallow recesses 24 of the flat external faces 20, as illustrated in FIG. 2. This sealing arrangement facilitates the removal and replacement of individual columns. Further, the system is modular, supporting the introduction of further columns having identical annular walls 10 and arrangements of apertures 14, 16 for their inlet and outlet ports.

In the first column 2, the flow guidance device 18 is reversed relative to the following three columns in order that the incoming air flows initially to the outside of the water separator 60a.

The flow guidance devices 18 of the columns 2 are joined to their respective purifying components 60a-d such that each purifying component can be lifted out of its column simultaneously with its flow guidance device, as indicated by the block arrow above the second column.

Multi-Bore Columns

Instead of a single bore, the column, although still based on a single extrusion, can have a plurality of annular walls defining respective and parallel bores. In use, the bores contain respective purifying components.

Figure 9:
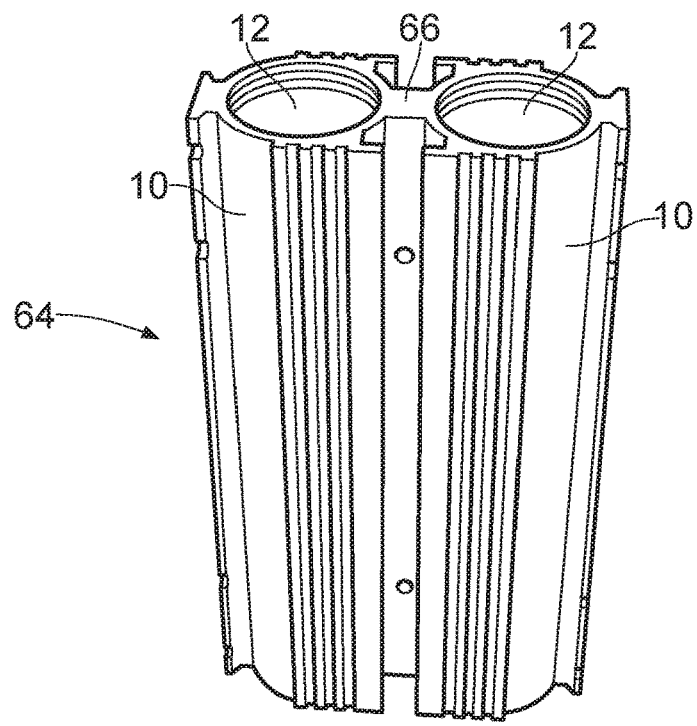
FIG. 9 shows an extrusion for a purification column having two parallel bores.

FIG. 9 shows an extrusion 64 for a column having two parallel bores 12, each defined by respective annular walls 10 sharing a common connecting portion 66 that extends the length of the extrusion.

Figure 10:
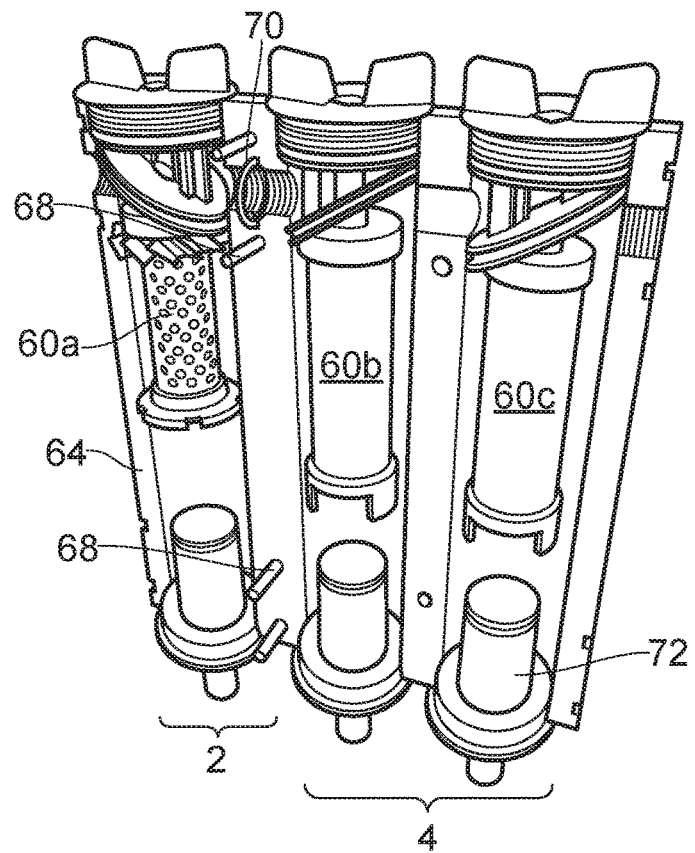
FIG. 10 shows a cross section through a purification system having close-coupled columns, one having a double-bore extrusion, and the other having a single-bore extrusion.

FIG. 10 shows a cross section through a purification system having one column 4 based on the double-bore extrusion 64, and another neighbouring column 2 having a single bore extrusion. The two columns are sealed along respective external flat faces by wedge connectors, dowel pins and bolts 68 as discussed more fully below. An O-ring seal 70 contained in a recess formed in one of the flat faces close-couples adjacent ports of the neighbouring columns However this two-part assembly could be replaced by a column based on a single triple bore extrusion, thus saving machine, bolting and seal costs.

The bores are in flow series, with air flowing from left to right in series through the water separator 60a of the single-bore column 2 and then through successive filter assemblies 60b, c of the double-bore column 4. Within the double-bore column 4, the bores have interconnecting inlet and outlet ports, such that the second aperture (outlet) of the upstream bore opens to the first aperture (inlet) of the downstream bore.

In FIG. 10, the columns 2, 4 have automatic condensate drains 72 built in to their second end covers.

Figure 11:
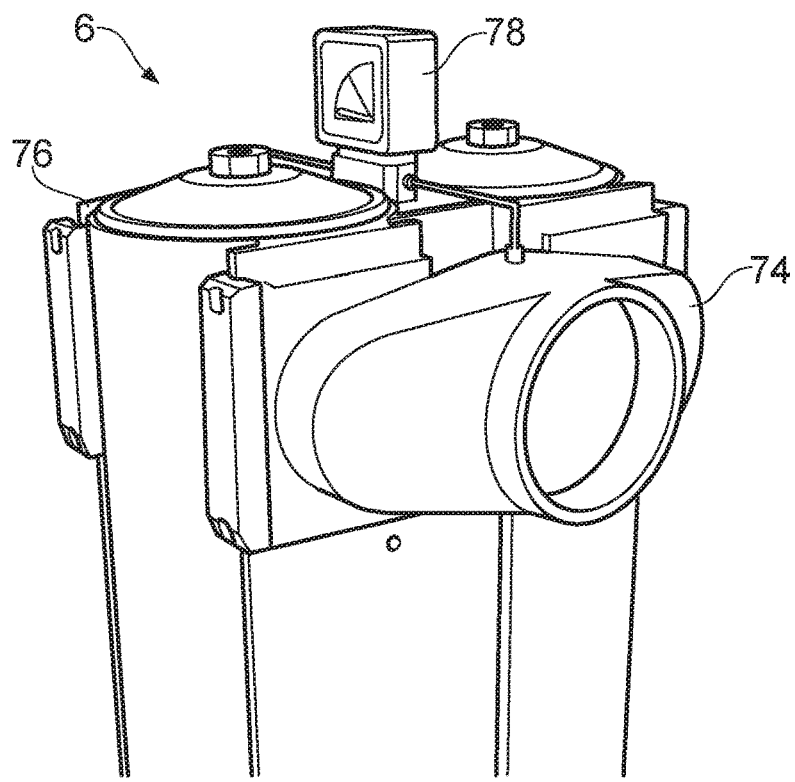
FIG. 11 shows the end of double-bore column having two separate and parallel bores.

Instead of interconnecting the ports of neighbouring bores in a multi-bore column, the bores may be kept separate, allowing them to be used in parallel rather than in flow series and thereby increasing overall flow rates while retaining the pressurisation capability of a small diameter column For example, FIG. 11 shows the first end of a double-bore column 6 having two separate and parallel bores. A removable entrance manifold 74 connects to the inlet ports of the two bores and splits the incoming fluid flow between the inlet ports. Similarly, a removable exit manifold 76 connects to the outlet ports of the two bores and combines the fluid flows received from the outlet ports.

The manifolds 74, 76 have screwed pipe threads for connection to threaded pipework of adjacent fluid systems. Another option, however, is for the manifolds to have boltable flanges for connection to adjacent fluid systems. Bolted flanges are generally used and preferred on higher flow applications where the associated pipework is larger than 50 mm diameter.

In FIG. 11, a differential pressure gauge 78 taps into the manifolds 74, 76 to sense the differential pressure across the filter assemblies contained in the bores.

Figure 12:
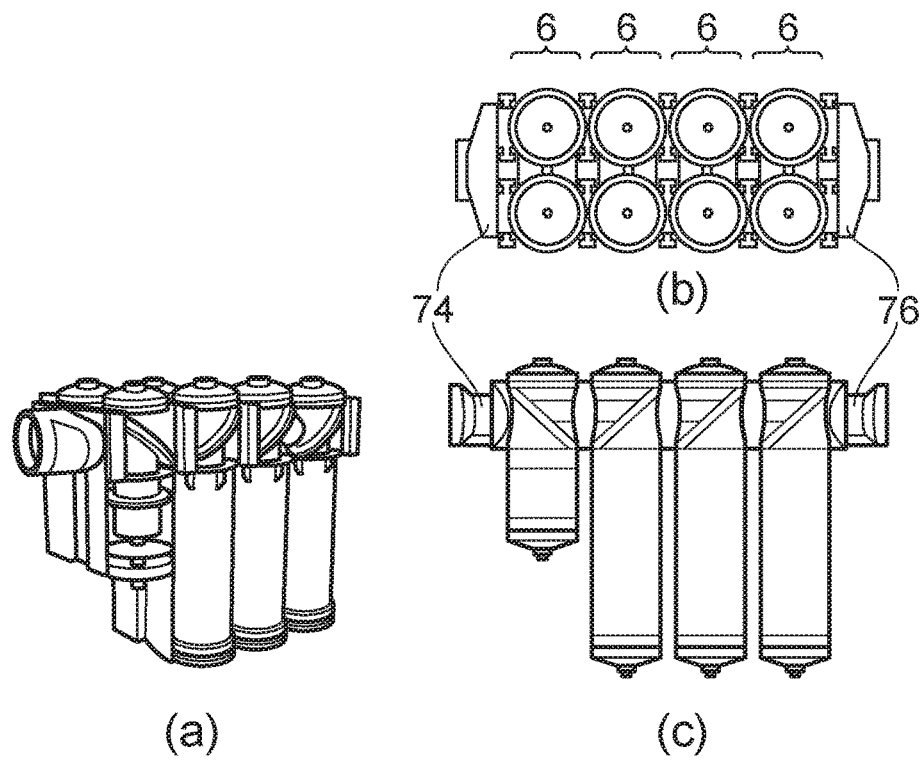
FIG. 12 shows (a) a sectioned perspective view, (b) a top view and (c) a see-through side view of a purification system in which four double-bore columns are banked together to form two parallel purification rows.

FIG. 12 shows (a) a sectioned perspective view, (b) a top view and (c) a see-through side view of a purification system in which four double-bore columns 6 (of the type shown in FIG. 11) are banked together to form two parallel purification rows. Each column donates a respective bore to each row, and within each row the bores are arranged in flow series such that, between the inlet port to the first bore and the outlet port from the last bore, the fluid enters, flows through and exits each column in turn. When multi-bore columns of this type are close-coupled together, only one pair of entrance 74 and exit 76 manifolds is required, helping to lower machining costs and the reduce mass of material required. The reduced weight of such systems is another significant advantage.

Porting Blocks and Manifolds

The porting blocks 28 and manifolds 74, 76 described above provide great flexibility, allowing modular columns to be fitted to any type of pipe thread or flange type.

Figure 13:
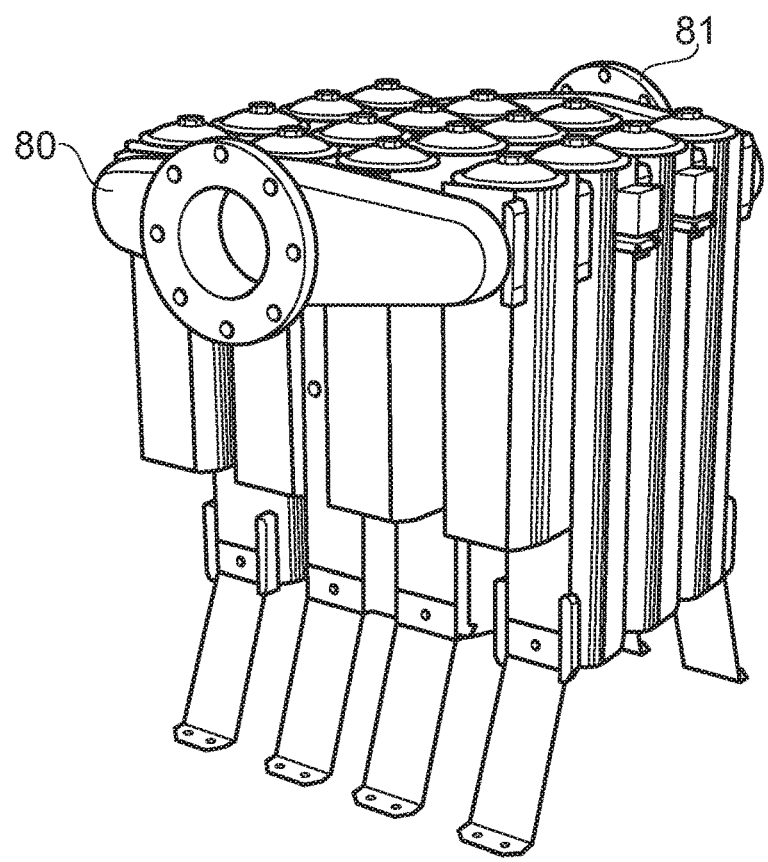
FIG. 13 shows a banked purification system having four parallel purification rows.

For example, FIG. 13 shows a banked purification system having four parallel purification rows, each containing a water separator followed by three successive filter assemblies. The rows can be assembled from a combination of single-bore columns, multi-bore columns or combinations thereof. The system has four-way entrance 80 and exit 81 manifolds with inlet and outlet flanges, making a very high flow system. To achieve the same flow throughput in a conventional way with four heavy welded and fabricated filter bodies would be a much more costly and problematic installation.

In the examples described above, the porting blocks 28 and manifolds 74, 76, 80, 81 are all configured to receive and deliver fluid flows from and to adjacent fluid systems along directions which are parallel to the centre line of the inlet and outlet apertures 14, 16 of the bores. In practice, however, the porting blocks and manifolds can be angled to receive and deliver fluid flows along different (i.e. angled) directions, as required by the adjacent fluid systems.

Extrusion Options

The purification columns described above have annular wall(s) 10 which define central bore(s) 12. The walls are formed by extrusions and these generally also provide the flat external faces 20 and, in the case of multi-bore columns, connecting portions 66, which extend the length of the columns.

The extrusions can further have external longitudinal slots, which can be used for bolting purposes. For example, mounting brackets can be bolted to columns using such slots. Other possible uses of the slots are for fitting: labels and logos, identity plates, pressure gauges, drain valves, sight glasses, additional porting blocks or manifolds, and aesthetic attachments (e.g. covers and trims).

Figure 14:
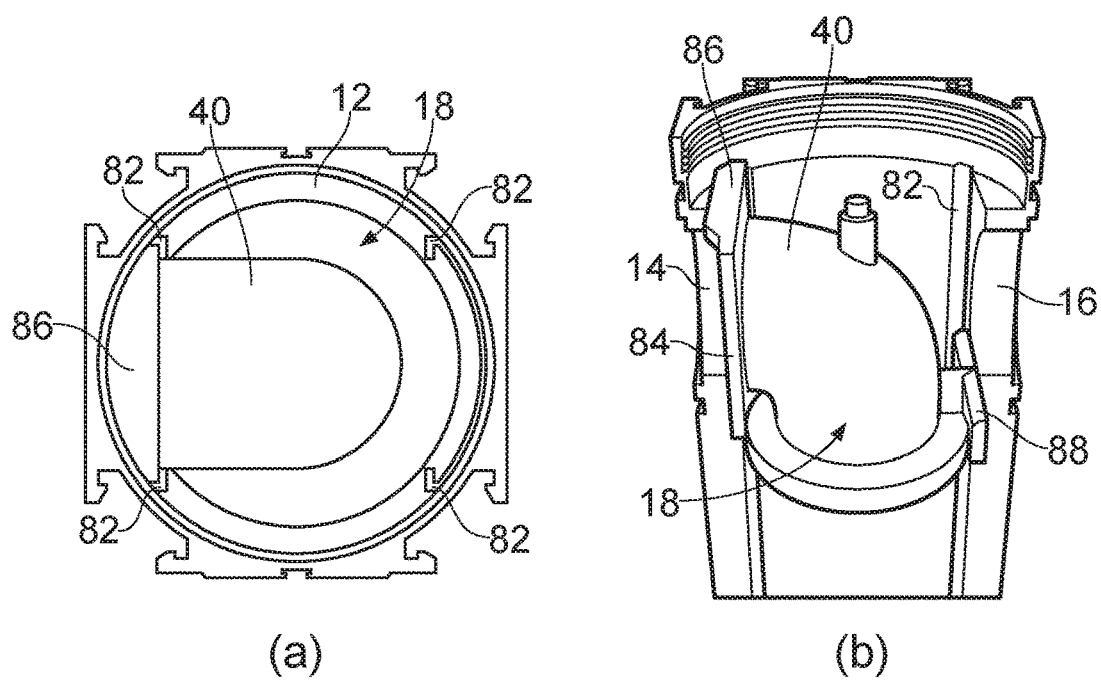
FIG. 14 shows (a) a top view and (b) a sectioned side view of a single-bore extrusion with a flow guidance device located in the bore.

The extrusions can further have internal longitudinal slots or ribs. Flow guidance devices 18 can be positioned and aligned by means of such features. FIG. 14 shows, for example, (a) a top view and (b) a sectioned side view of a single-bore extrusion with a flow guidance device 18 located in the bore 12. Pairs of longitudinally extending ribs 82 project into the bore at either side of the inlet and outlet port apertures 14, 16.

The flow guidance device 18 has a rectangular shaped flange 84 around the mouth of its conduit 40 which fits snugly between the pair of ribs 82 at the inlet port aperture 14 to correctly angularly locate the guidance device, and a stop 86 at the top of the flange which abuts the tops of the ribs to correctly longitudinally locate the guidance device. The flange provides a secure and close-fitting interface fit ensuring a good seal between the flow guidance device and the inlet port.

In addition, the flow guidance device 18 has a stabilising member 88 at its opposite side which interfaces between the pair of ribs 82 at the outlet port aperture 16 to stabilise the guidance device in the column.

As the ribs 82 are symmetrically arranged across the bore 12, the flow guidance device 18 can be located in a 180° rotated position if the need arises, e.g. to suit the flow direction in adjacent fluid systems.

Figure 15:
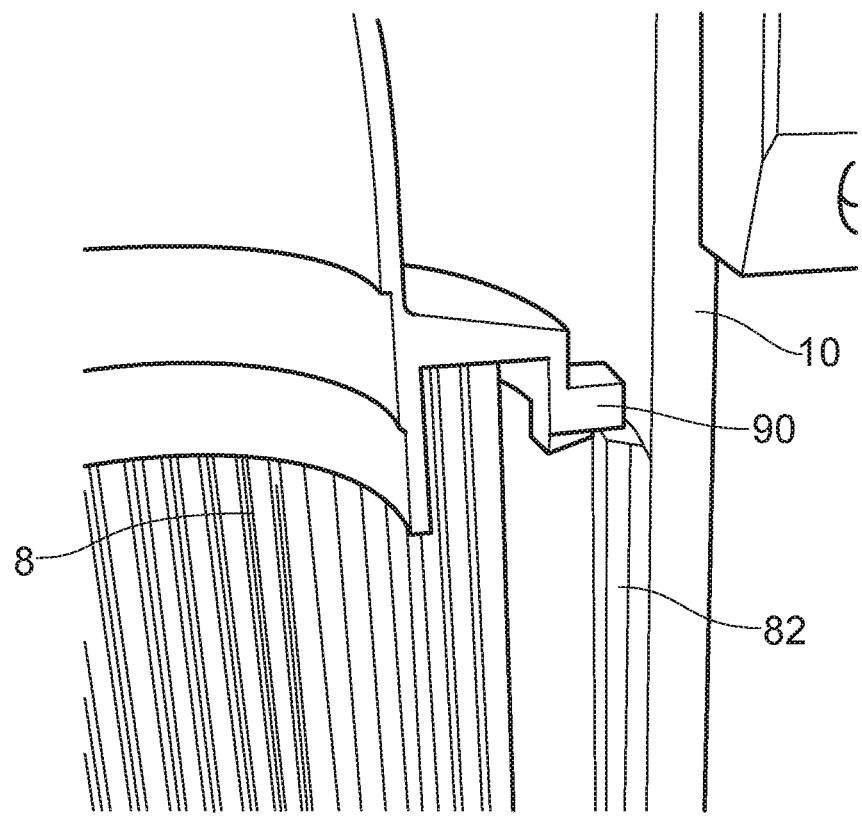
FIG. 15 shows a cross-section through the top end of a top-loading filter assembly within a purification column.
Figure 16:
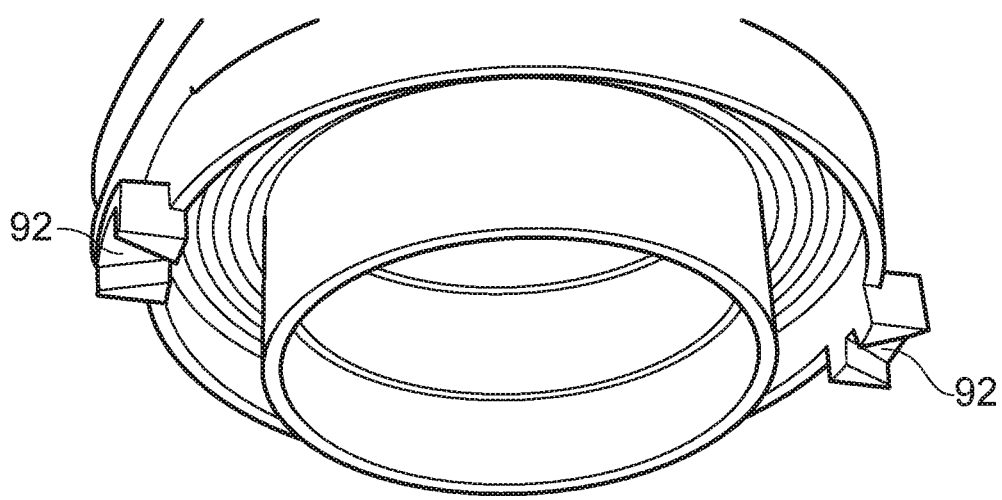
FIG. 16 shows a flow guidance device moulding with integrated features forming the top end of a filter assembly.

Internal slots or ribs can also be used to locate the purifying component in the bore 12. For example, as shown in FIG. 15, internal ribs 82 can be machined back to form a ledge on which a rim 90 at the top of a top-loading filter assembly 8 can rest. As shown in FIG. 16, which shows a moulding which integrates the flow guidance device with the top end of a filter assembly, the assembly can also have location formations 92 which engage with such ribs to radially locate the assembly.

Purifying Components

The modular purification systems described above are extremely versatile, with their multi-function flow guidance devices allowing many forms of purifying component to be fitted. The modular concept also allows the system to be extended to include pre-purification treatments and post-purification treatments. For example as a pre-purification treatment, the first column can include a heat exchanger to either add heat or remove heat from the fluid. In the same way, this can be a post-purification treatment option for the final column.

In most instances the purifying or fluid treatment component is top-loading, whereby it slides into position from the first end nearest the inlet and outlet ports (which are commonly at the top of the column). However some applications may dictate a bottom-loading purifying component. Furthermore, although the purification column(s) are normally vertically orientated, they can also be horizontally orientated, or any angle in between.

Possible types of purifying component include: centrifugal water separators, particulate and coalescing filter elements, adsorbent filter elements such as activated carbon filter elements, absorbent cartridges, adsorbent cartridges and desiccant cartridges. The purifying component can also be in the form of a membrane with selective pore size. Such membranes are commonly used for drying compressed air and gas generation, i.e. nitrogen.

Column Close-Coupling

Figure 17:
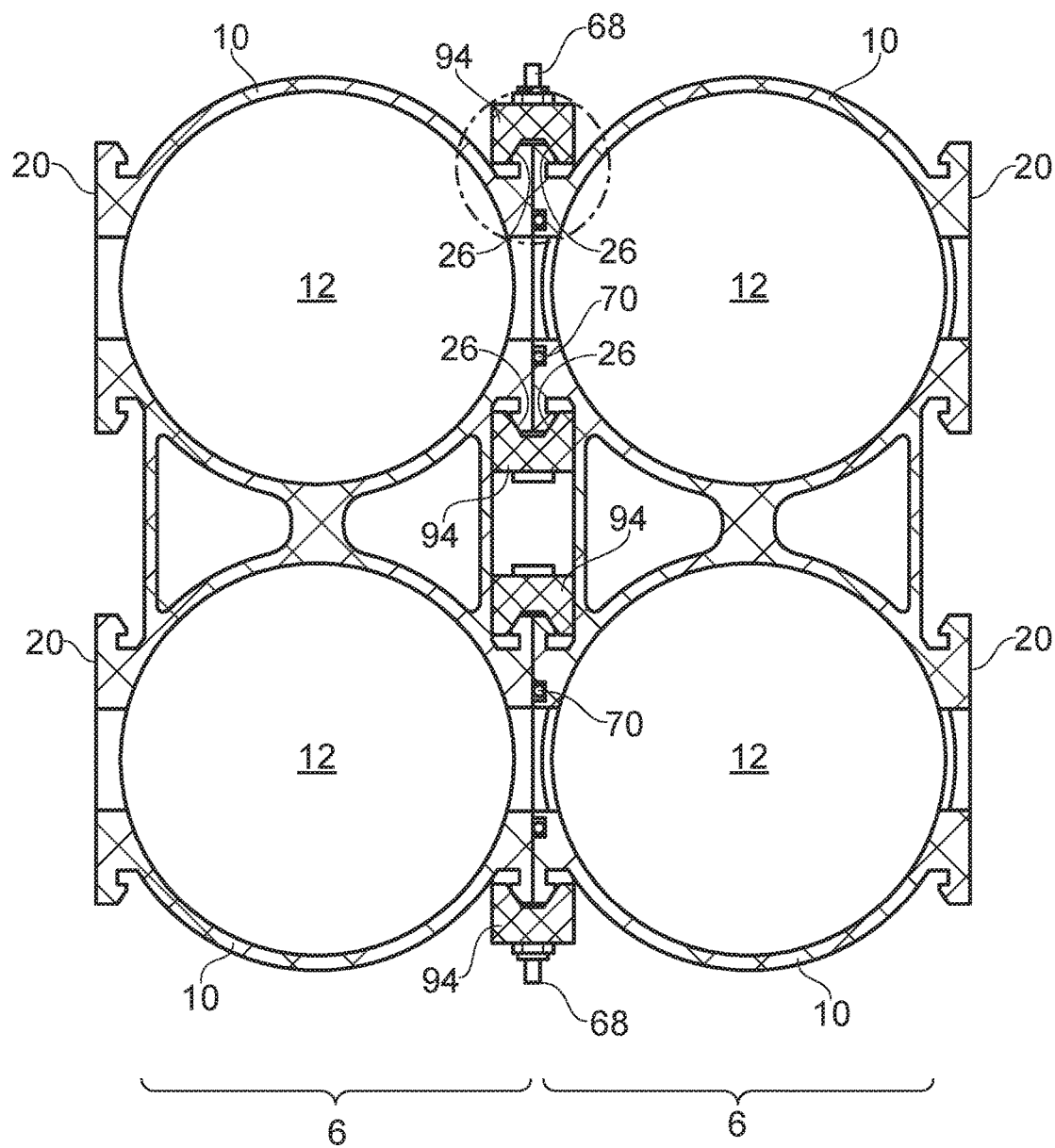
FIG. 17 shows a cross-section through the inlet and outlet ports of two double-bore columns in a banked purification system having two parallel purification rows.

FIG. 17 shows a cross-section through the inlet and outlet ports of two double-bore columns 6 in a banked purification system having two parallel purification rows. Associated with each port is a flat external face 20. Pairs of these faces contact each other to join the outlet ports of one column to the inlet ports of the other column so that the columns are close-coupled.

The two columns 6 are held together across their joined ports by fasteners in the form of wedge connectors 94 and bolts 68 (also shown in FIG. 10). Each wedge connector 94 is fitted over a pair of the angled fastening surfaces 26 associated with the contacting flat faces 20. The wedge connectors, e.g. when manufactured as coloured plastic extrusions, can be used as aesthetic trims.

Figure 18:
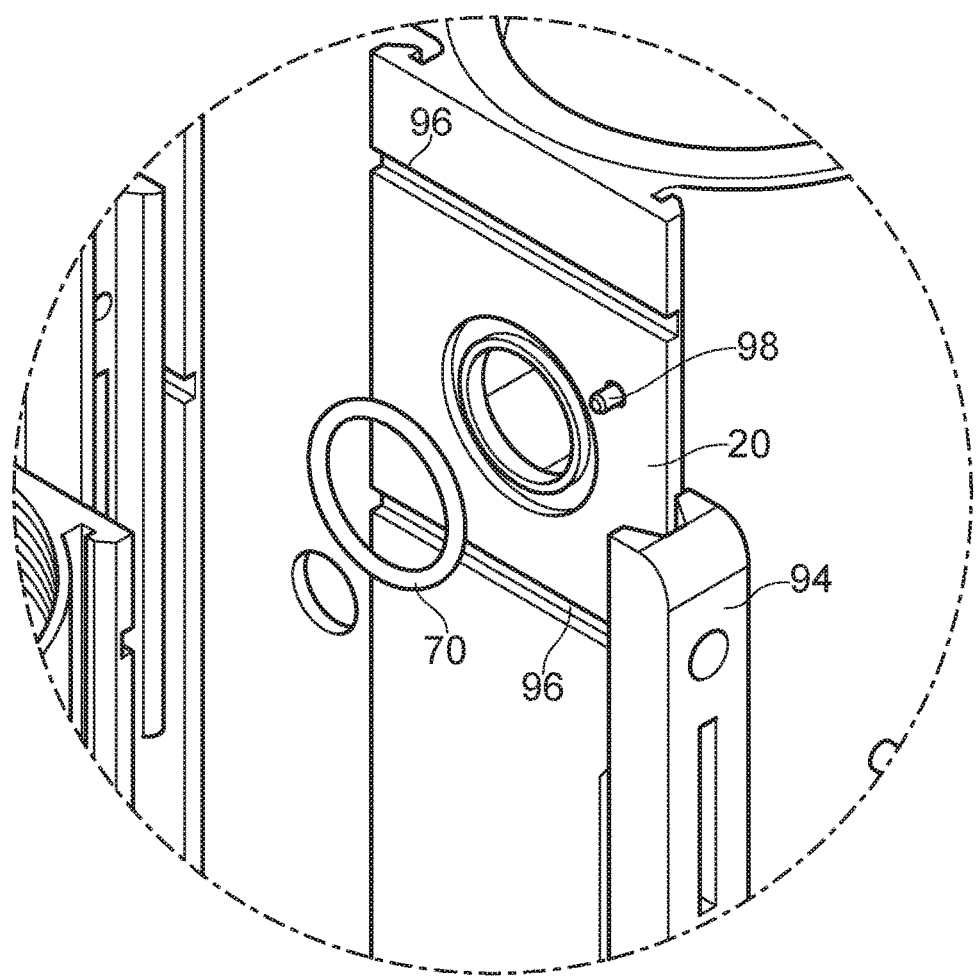
FIG. 18 is a view of the external flat face around an inlet or outlet port of one of the columns of FIG. 17.

Each angled fastening surface 26 is formed at a respective edge of the flat face 20 of a respective port. Each port thus has a fastening surface at one side and another fastening surface at the other side. In this way, when two ports are joined, the pairs of fastening surfaces 26 of the two ports oppose each other across the interface between the contacting flat faces. A respective wedge connector 94 is fitted over each pair of opposing fastening surfaces. The two wedge connectors are pulled together under the action of a pair of the bolts 68, which extend between the wedge connectors, and which are housed in channels 96 machined into the flat faces, as shown in FIG. 18 which is a view of the flat face around one of the ports. The wedge connectors urge the fastening surfaces together, compressing the O-ring seals 70 located in circular recesses in one or each connecting pair of the flat faces.

The angle between the opposing fastening surfaces 26 over which each wedge connector 94 is fitted preferably lies in the range from 30° to 70°.

As shown in FIG. 18, for each pair of connecting ports a locating member 98 in the form of a dowel pin projecting from one flat face 20 sits in a matching recess (not shown) formed in the contacting flat face. When used in conjunction with the wedge connectors 94, the locating members and recesses produce an extremely rigid construction.

Figure 19:
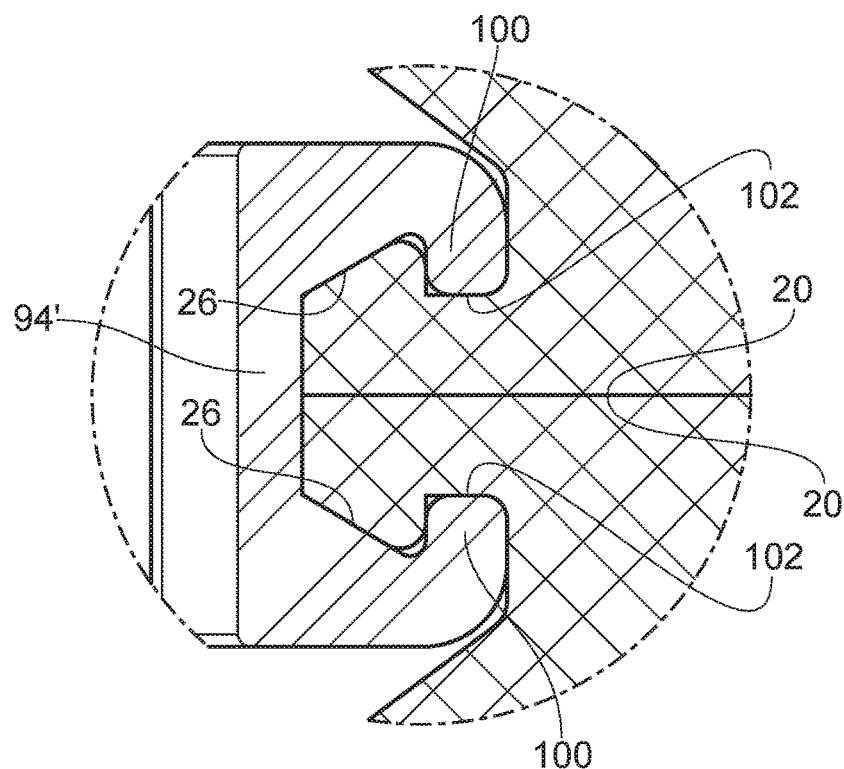
FIG. 19 shows detail of the connection interface between two joined ports.

FIG. 19 shows a variant wedge connector 94' having protrusions 100. This wedge connector is used in conjunction with flat faces 20 that have retention grooves 102 located behind their angled fastening surfaces 26. The wedge connector fits over a pair of opposing angled fastening surfaces by slidingly locating the protrusions in the retention grooves. When the wedge connector is sufficiently strong and rigid, and bears with sufficient force on the fastening surfaces, the connector can hold the ports in fluid tight connection without recourse to e.g. bolts to pull opposing wedge connectors together.

Figure 20:
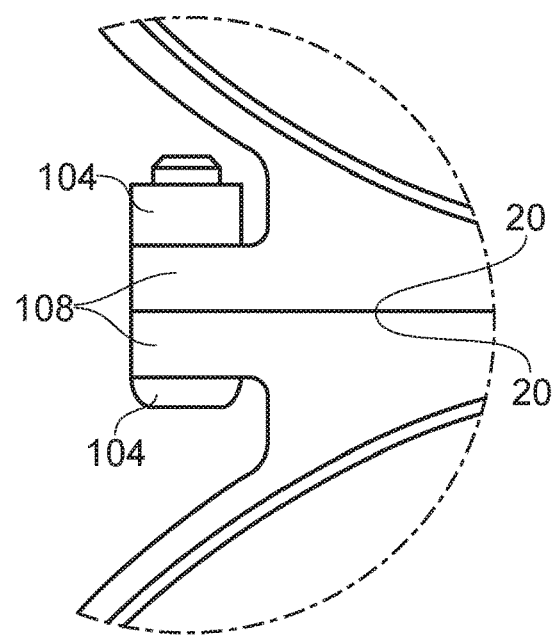
FIG. 20 shows detail of another connection interface between two joined ports

FIG. 20 shows another possibility for fasteners to join the ports together. In this case, the fasteners are nuts 104 and bolts 106 located at flanges 108 forming the edges of the flat faces 20. The flanges can be of simple configuration as they do not need to provide angled fastening surfaces.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

We claim:

1. A purification column in which a fluid is purified by flow through a purifying component, the purification column comprising:
   an annular wall defining a bore which, in use, contains the purifying component;
   an inlet port opening to the bore, said inlet port comprising a first aperture through said annular wall, said inlet port being adjacent one end of the purification column;
   an outlet port opening from the bore, said outlet port comprising a second aperture through said annular wall, said outlet port being adjacent the one end of the purification column;
   a flow guidance device within said bore and removably connected to said inlet port and said outlet port so as to guide the fluid to the purifying component from said inlet port and so as to guide the fluid from the purifying component to said outlet port, the flow guidance device maintaining separation of the fluid flows to and from the purifying component; and
   wherein said annular wall is an extruded body.

2. The purification column of claim 1, wherein said first and second apertures diametrically oppose each other across said bore.

3. The purification column of claim 1, further comprising:
   a first cover closing said bore at the one end of the purification column, said cover being removable to allow withdrawal, replacement or maintenance of the purifying component.

4. The purification column of claim 3, further comprising;
   a second cover closing said bore at another end of the purification column.

5. The purification column of claim 1, wherein said flow guidance device sealingly engages around a circumference of an inner surface of said annular wall to maintain separation of the fluid flows to and from the purifying component.

6. The purification column of claim 1, wherein said flow guidance device sealingly engages around said first aperture or said second aperture to maintain separation of the fluid flows to and from the purifying component.

7. The purification column of claim 3, wherein said first cover is formed integrally with said flow guidance device.

8. The purification column of claim 1, wherein said annular wall provides respective external planar engagement surfaces to said inlet port and said outlet port for connection to opposing planar engagement surfaces of ports of adjacent columns.

9. A purification column in which fluid is purified by flow through purifying components, the purification column comprising:
   an extruded unitary body having a plurality of annular walls defining respective and parallel bores which, in use, contain respective purifying components, wherein each annular wall of said plurality of walls comprises:
   an inlet port to the respective bore which comprises a first aperture through the annular wall, said inlet port being adjacent one end of the purification column;
   an outlet port from the respective bore which comprises a second aperture through the annular wall, said outlet port being adjacent the one end of the purification column; and
   a flow guidance device within the bore and removably connected to said inlet and outlet ports for guiding the fluid to the respective purifying component from said inlet port and for guiding the fluid from the respective purifying component to the outlet port, said flow guidance device maintaining separation of the fluid flows to and from the respective purifying component.

10. The purification column of claim 9, wherein, with respect of each annular wall of said plurality of annular walls, said first and second apertures diametrically oppose each other across the bore.

11. The purification column of claim 9, further comprising:
   a respective first cover closing each bore at one end of the column, said respective first cover being removable to allow withdrawal, replacement or maintenance of the purifying component.

12. The purification column of claim 11, further comprising:
   a respective second cover closing each bore at another end of the column to said respective first cover.

13. The purification column of claim 9, wherein, with respect to each annular wall of said plurality of annular walls, said flow guidance device sealingly engages around a circumference of an inner surface of the annular wall to maintain separation of the fluid flows to and from the purifying component.

14. The purification column of claim 9, wherein, with respect to each annular wall of said plurality of annular walls, said flow guidance device sealingly engages around said first aperture or said second aperture to maintain separation of the fluid flows to and from the purifying component.

15. The purification column of claim 11, wherein said respective first cover is formed integrally with the flow guidance device.

16. The purification column of claim 9, wherein each annular wall of said plurality of annular walls provides respective external planar engagement surfaces to the inlet and outlet ports for connection to opposing planar engagement surfaces of ports of adjacent columns.

17. The purification column of claim 9, wherein the bores are arranged in a flow series having interconnecting inlet and outlet ports, such that as between each pair of adjacent bores the second aperture of an upstream bore opens to the first aperture of a downstream bore.

18. A purification system having a row of two or more purification columns of claim 1, the columns being arranged in a flow series such that, between the inlet port of the first column and the outlet port of the last column, the fluid enters, flows through and exits each column in turn.

* * * * *